(12) United States Patent
Kato et al.

(10) Patent No.: US 6,437,621 B2
(45) Date of Patent: Aug. 20, 2002

(54) WAVEFORM SHAPING DEVICE (75) Inventors: Kazuo Kato, Tokai-mura; Takashi Sase; Takashi Hotta, both of Hitachi; Fumio Murabayashi, Urizura-machi, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/816,100

(22) Filed: Mar. 26, 2001

Related U.S. Application Data (63) Continuation of application No. 09/429,296, filed on Oct. 28, 1999, now abandoned.

(30) Foreign Application Priority Data

Oct. 28, 1999 (JP) ............................................. 10-306919

(51) Int. Cl.⁷ ................................................. H03K 3/17
(52) U.S. Cl. ........................ 327/175; 327/100; 327/165; 327/343; 331/48; 331/50
(58) Field of Search ................................ 327/172–175, 327/178, 180, 165, 343, 345, 350, 100, 309, 310, 321, 561; 331/57, 48, 50, 55; 330/310, 98, 127, 135; 375/284, 296

(56) References Cited

U.S. PATENT DOCUMENTS 4,065,682 A * 12/1977 Evans ..................... 324/103 P
4,196,845 A    4/1980 Chesters ................. 235/462.27
4,408,128 A   10/1983 Fujita ........................ 324/694
5,126,846 A    6/1992 Niimura ..................... 348/613

FOREIGN PATENT DOCUMENTS

JP       7-30422    1/1995
JP       1075461    3/1998

* cited by examiner

Primary Examiner—Timothy P. Callahan
Assistant Examiner—Minh Nguyen
(74) Attorney, Agent, or Firm—Antonelli, Terry, Stout & Kraus, LLP (57) ABSTRACT A waveform shaping circuit is provided so that the duty factor of clock pulses can be set to 50% with high accuracy even if the clock pulses are of a low voltage and a high frequency. An inverter which receives the clock pulses through an alternating current coupling capacitor is provided with a non-linear limiter element for limiting an amplitude of an output symmetrically on positive and negative sides thereof. A first current-limiting impedance and a second current-limiting impedance are connected between a power supply side terminal of the inverter and a power supply bus and between a grounding side terminal of the inverter and a grounding bus, respectively.

6 Claims, 8 Drawing Sheets

WAVEFORM SHAPING DEVICE

CROSS-REFERENCE TO RELATED APPLICATION

This application is a continuation application of Ser. No. 09/429,296, filed on Oct. 28, 1999, now abandoned, the entire disclosure of which is hereby incorporated by reference.

BACKGROUND OF THE INVENTION

1. Field of the Invention

The present invention relates to a waveform shaping device for obtaining low-voltage and high-frequency clock pulses having a duty factor of 50%.

2. Description of the Related Art

A microprocessor or a communication encoder/decoder driven in synchronism with a clock requires clock pulses of 50% duty factor from the view points of high speed operation and easiness of logic design.

As conventional methods of obtaining clock pulses of 50% duty factor, there are known a method that a clock pulse output from a clock oscillator is input to a flip-flop circuit to divide the frequency into ½, and a method that a level of a clock pulse output from a clock oscillator is converted by integrating the duty factor and a threshold value of the clock oscillator is negatively fed back using a differential amplifier.

In addition to the above, methods of obtaining clock pulses of 50% duty factor are also disclosed, for example, in Japanese Patent Application Laid-Open No.10-75461 and Japanese Patent Application Laid-Open No.7-30422.

In the method of dividing the frequency using the flip-flop circuit, the power consumption becomes large because both of the clock oscillator and the flip-flop circuit require an operation frequency twice as high as that of the clock pulse, and when the frequency of the clock pulse becomes 10 MHz to 1 GHz, the necessary pulses having the double oscillation frequency themselves are difficult to be obtained even if the power consumption is increased.

On the other hand, in the method of negatively feeding back the threshold value of the clock oscillator, the differential amplifier is difficult to be construct so as to accurately operate under a condition of a low voltage of nearly 1 V and a high frequency of 1 GHz.

SUMMARY OF THE INVENTION

The conventional technologies have a problem in that the duty factor of clock pulses of a low voltage and a high frequency can not be set to 50% with high accuracy.

In order to solve the above problem, an object of the present invention is to provide a waveform shaping circuit by which the duty factor of clock pulses can set to 50% with high accuracy even if the clock pulses are of a low voltage and a high frequency.

The present invention is characterized by that an inverter amplifier for receiving clock pulses through an alternating current coupling capacitor is provided with a non-linear limiter element for limiting an amplitude of an output symmetrically in a positive and a negative sides, and a first current-limiting impedance and a second current-limiting impedance are connected between a power supply side terminal of the inverter amplifier and a power supply bus and between a grounding side terminal of the inverter amplifier and a grounding bus, respectively.

In the present invention, it is preferable that an inverter amplifier having a high input impedance is used as the inverter amplifier, diodes in anti-parallel connection is used for the non-linear element, and a constant-current circuits are used for the current-limiting impedances.

According to the present invention, since the inverter amplifier does not allow a direct-current component pass through and the amplitude of the output of the inverter amplifier is limited so as to be symmetrical in a positive and a negative sides, a threshold value of the output waveform (clock pulse waveform) of the inverter amplifier is shifted so that the threshold value of the positive half-cycle and the threshold value of the negative half-cycle always becomes equal to each other. In addition to this, since the output waveform of the inverter amplifier has a rising and a falling gradients due to the current-limiting impedances, there exist a rise time and a fall time. As a result, the output waveform of the clock pulse of the inverter amplifier by the threshold value shifted so that the threshold values of positive the half-cycle and the negative half-cycle becomes equal to each other is shaped in a waveform nearer to 50% duty factor than the input clock pulse waveform.

DESCRIPTION OF THE PREFERRED EMBODIMENTS

Figure 1:
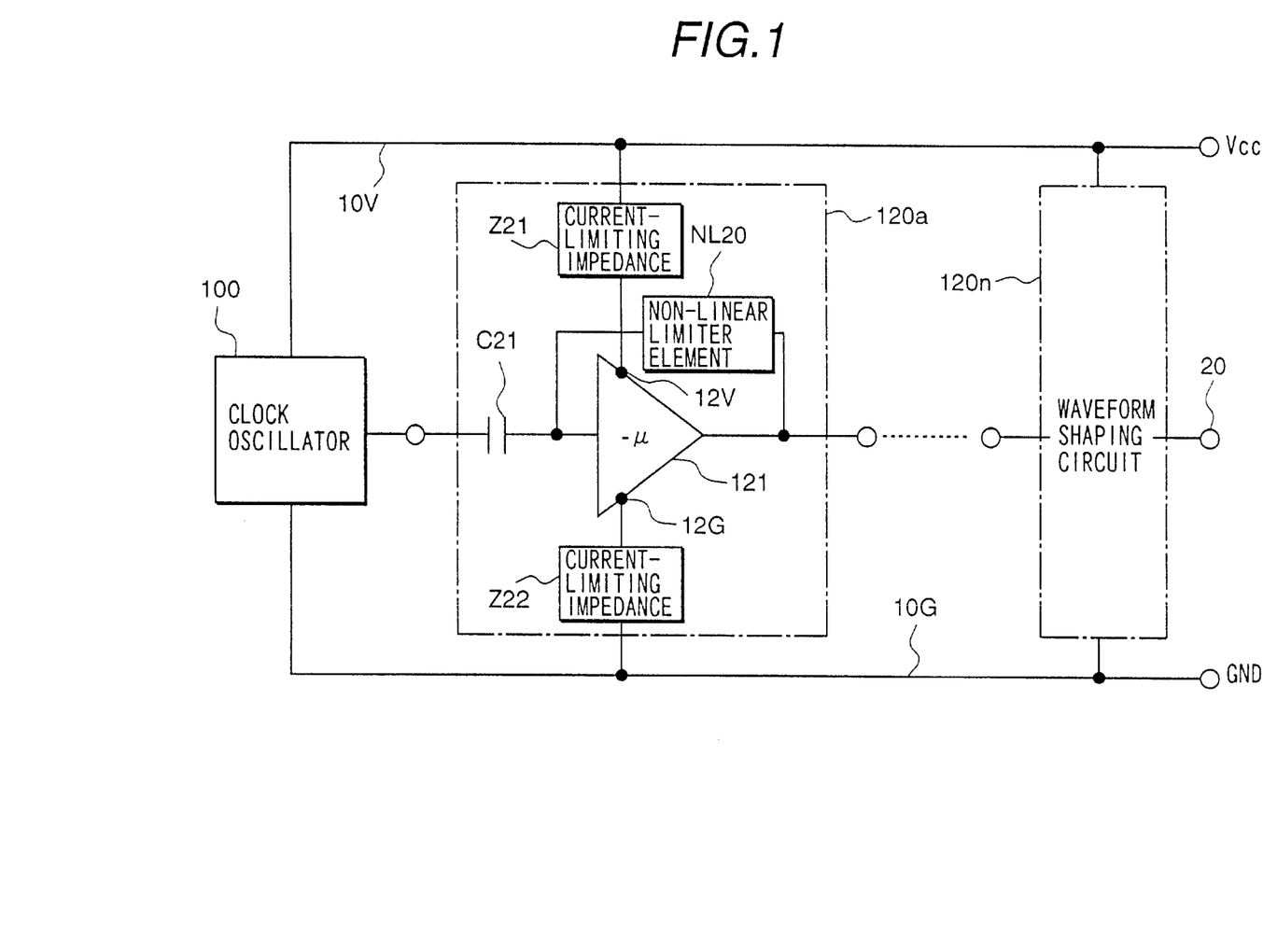
FIG. 1 is a circuit diagram showing an embodiment in accordance with the present invention.

FIG. 1 is a circuit diagram showing an embodiment of the present invention.

Figure 2:
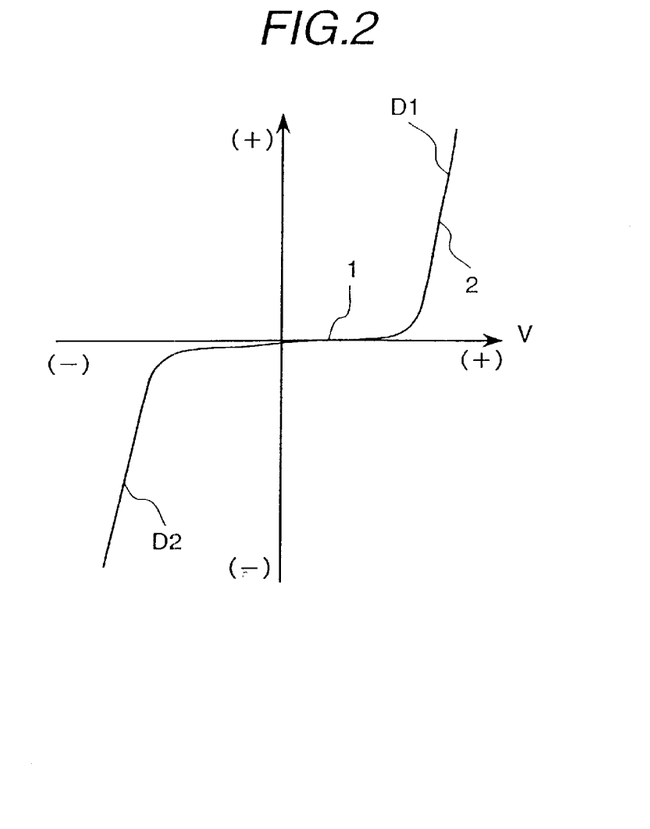
FIG. 2 is a graph showing the characteristic of an example of a non-linear limiter element used in the present invention.

Referring to FIG. 1, clock pulses output from a clock oscillator 100 are input to a waveform shaping circuit 120a. The clock oscillator 100 is connected between a bus 10V of a power supply voltage of Vcc and a bus 10G of a grounded voltage of GRD to be supplied with electric power. An input side of an inverter amplifier 121 composing the waveform shaping circuit 120a is connected to the clock oscillator 100 through a capacitor C21 for performing alternating current coupling. The inverter amplifier 121 used has a high amplification factor -μ and a high input impedance. An inverter amplifier composed of a CMOS device is used as the inverter amplifier 121. A non-linear limiter element NL20 for limiting a positive and a negative amplitudes is connected between an input and an output of the inverter amplifier 121 as a feedback element. The non-linear limiter element NL20 used is formed by connecting diodes in anti-parallel to utilize the barrier layer voltage of the diodes. The characteristic becomes as shown in FIG. 2 when the anti-parallel connected diodes are let be D1 and D2. The denotation I in the ordinate of FIG. 2 indicates the current and the denotation V in the abscissa indicates the voltage. A power supply side terminal 12V of the inverter amplifier 121 is connected to the power supply bus 10V through a current-limiting impedance Z21, and a ground side terminal 12G is connected to the ground bus 10G through a current-limiting impedance Z22.

As described above, the waveform shaping circuit 120a is composed of the inverter amplifier 121, the alternating current coupling capacitor C21, the non-linear limiter element NL20 and the current-limiting impedances Z21 and Z22.

A plurality of such waveform shaping circuits 120 are connected in a cascade, and clock pulses are output from the output terminal 20 of the waveform shaping circuit 120n in the last stage.

Figure 3:
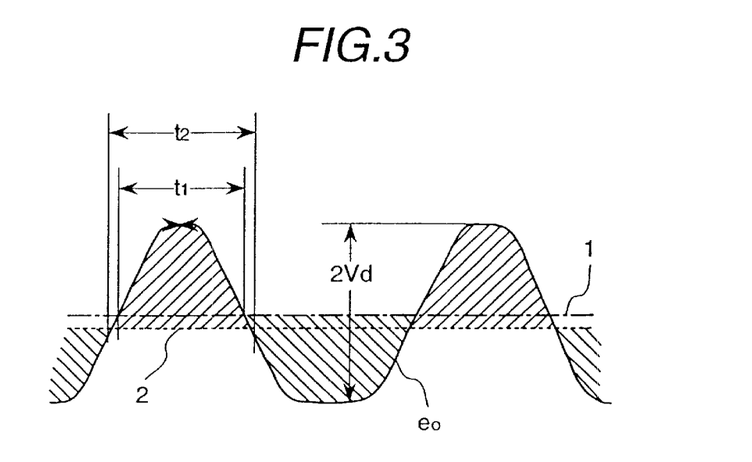
FIG. 3 is a wave chart explaining operation in the present invention.

Here, it is assumed in this configuration that the clock oscillator 100 outputs clock pulses e0 having a threshold value of a level 1 as shown by a chain line in FIG. 3 of which the duty factor deviates from 50%.

The clock pulse output from the inverter amplifier 121 is limited in the amplitude by the non-linear limiter element NL20, and becomes a trapezoidal wave having an amplitude of 2 Vd. Therein, the denotation Vd is the barrier layer voltage of the diode. The inverter amplifier 121 is of high input impedance, and the direct current component of the clock pulses output from the clock oscillator 100 is removed by the capacitor C21. Therefore, the threshold value to the clock pulse waveform e0 output from the inverter amplifier 121 is automatically shifted to the level 2 shown by a dashed line in FIG. 3 so that the areas of the waveform in the positive side and in the negative side become equal to each other. As the level of the threshold value is shifted from the level 1 to the level 2, the duty time in the positive side is lengthened from t1 to t2 so that the duty factor is brought close to 50%.

By connecting the plurality of waveform shaping circuits 120a to 120n in a cascade as shown in the embodiment of FIG. 1, the duty factor can be limitlessly brought closer to 50%. In general, by connecting the waveform shaping circuits 120a to 120n in a cascade of two- to three-stages, the duty factor can be brought closer to 50%.

Figure 4:
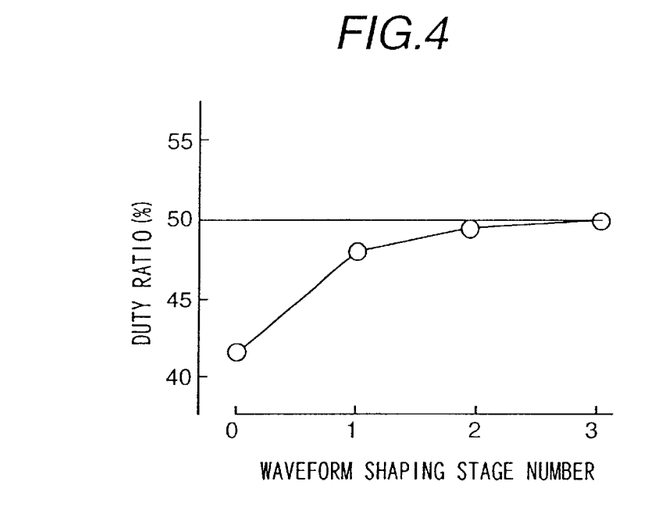
FIG. 4 is a chart showing a result of improving a duty factor by the present invention.

FIG. 4 shows an example of a simulation result of the duty factor by the present invention in a case where the clock pulse is of 1 V and 1 GHz. When a duty factor of the output clock pulse of the clock oscillator 100 is assumed to be 42%, the duty factor becomes 48.5% by the waveform shaping circuit 120 in the first stage, 49.5% in the second stage and 50% in the third stage.

Since a required duty factor is generally 50%±2%, the required duty factor can be obtained by a one- to two-stage connection of the waveform shaping circuits of the present invention. It is clear from the characteristic of FIG. 4 that a single stage of the waveform shaping circuit of the present invention is large in the improving effect on the duty factor, and it can be understood that even the single stage is practically useful.

Figure 5:
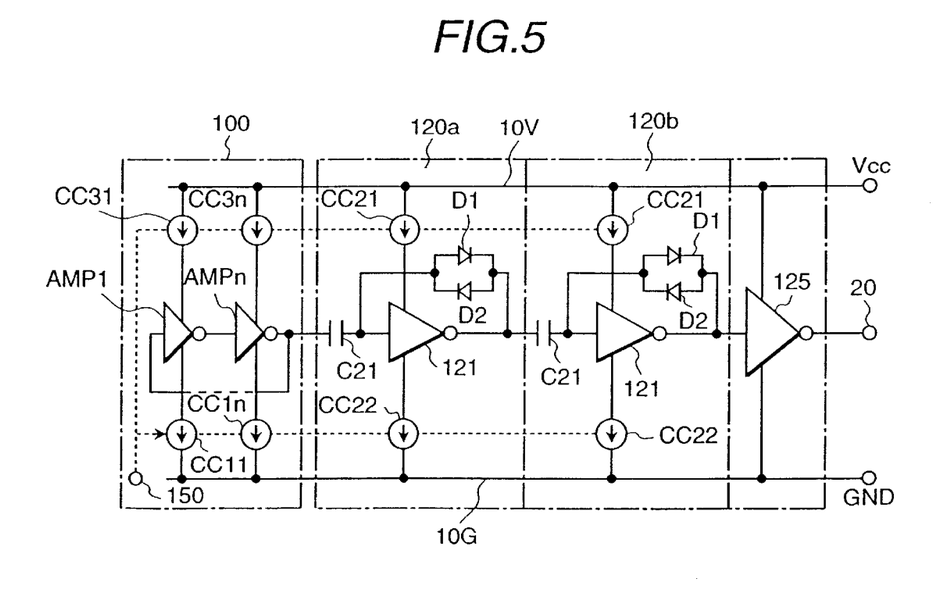
FIG. 5 is a detailed circuit diagram showing an embodiment in accordance with the present invention.

FIG. 5 is a detailed circuit diagram showing an embodiment of the present invention.

Referring to FIG. 5, the clock oscillator 100 is a ring counter composed of a plurality of inverter amplifiers (CMOS inverter amplifiers) AMP1 to AMPn and a plurality of constant-current circuits CC31 to CC3n, CC11 to CC1n. The waveform shaping circuits 120a, 120b are connected in a cascade of two stages, and diodes D1, D2 connected in anti-parallel are used as the non-linear limiter element of the waveform shaping circuit 120, and constant-current circuits CC21, CC22 are used as the current limiting impedance. Clock pulses having a duty factor nearly 50% obtained from the waveform shaping amplifier 120b in the second stage are output from an output terminal 20 through an output inverter amplifier 125. CMOS inverter amplifiers are used for the inverter amplifiers 121 of the waveform shaping circuits 120a, 120b and the output inverter amplifier 125.

Each of the constant-current circuits CC31 to CC3n, CC11 to CC1n of the clock oscillator 100 and the constant-current circuits CC21, CC22 of the waveform shaping circuits 120a, 120b is constructed of a MOS current mirror circuit. A control current is applied from a current control terminal 150 to the constant-current circuits CC31 to CC3n, CC11 to CC1n, CC21, CC22. As the control current applied to the current control terminal 150 is increased, the oscillation frequency of the clock oscillator 100 is increased and the impedance of the constant-current circuits CC21, CC22 are decreased. In the embodiment of FIG. 5, clock pulses having a duty factor 0 f 50% can be obtained from the output terminal 20, as described in FIG. 1. The simulation result shown in FIG. 4 is the characteristic based on the circuit configuration shown in FIG. 5.

In the embodiment of FIG. 5, the control currents of the constant-current circuits CC31 to CC3n, CC11 to CC1n of the clock oscillator 100 and the constant-current circuits CC21, CC22 of the waveform shaping circuits 120a, 120b are ganged-controlled. As the control current is increased, the current limiting impedance values of the constant-current circuits CC21, CC22 are increased and the rising and the falling gradients of the clock pulse are increased. On the other hand, as the control current of the control currents of the constant-current circuits CC31 to CC3n, CC11 to CC1n is increased, the oscillation frequency of the clock oscillator 100 is increased.

Therefore, when the frequency of the clock pulse of the clock oscillator 100 is increased, the rising and the falling gradients of the output clock pulse of the waveform shaping circuits 120a, 120b become large. The waveform shaping circuits 120a, 120b can maintain the ratios of the rise time and the fall time to the pulse width constant even if the frequency of the input clock pulse is largely changed. As a result, the duty factor of the clock pulse can be set to 50% with a high accuracy over a wide range of the frequency.

FIGS. 6A to 6D show other embodiments of non-linear limiter elements.

Figure 6A:
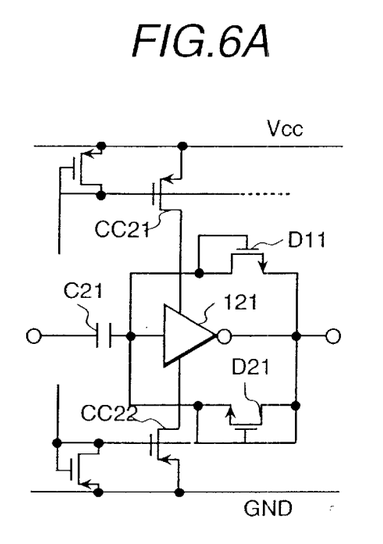
FIGS. 6A, 6B, 6C, 6D are circuit diagrams showing connection of various kinds of non-linear limiter elements used in the present invention.

FIG. 6A shows an embodiment in which MOS diodes D11, D21 are used for the non-linear limiter elements. Because the constant-current circuits CC21, CC22 and the inverter amplifier can be formed in a MOS element when the MOS diodes D11, D21 are used, the embodiment has an advantage in that the circuit can be easily constructed and the amplitude limiting value can be arbitrarily designed.

Figure 6B:
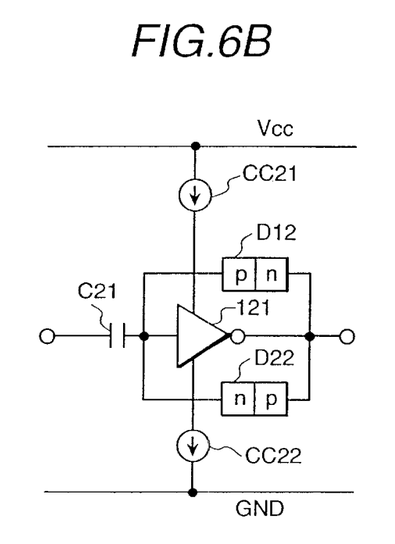
Figure 6C:
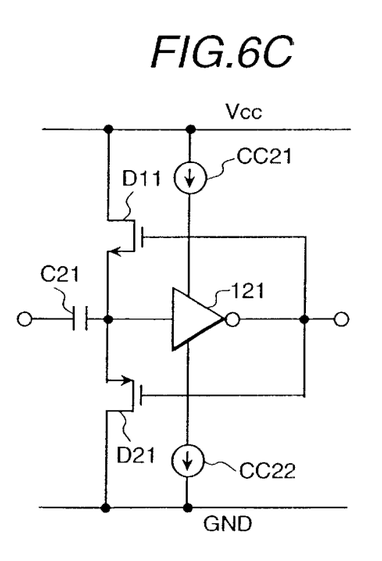

FIG. 6B shows an embodiment in which pn junction diodes D12, D22 are used for the non-linear limiter elements. The symmetry in the positive and the negative limiting values of the amplitude can be improved when the pn junction diodes D12, D22 are used.

FIG. 6 (c) shows an embodiment in which a source follower type is employed by using MOS diodes D11, D21 for the non-linear limiter elements. The embodiment of FIG. 6C can be operated with a high speed in addition to having the same advantage of FIG. 6A.

Figure 6D:
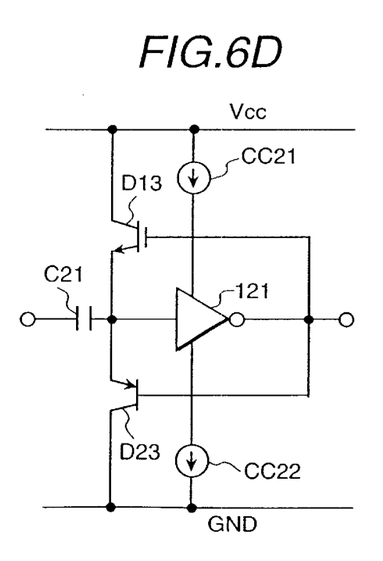

FIG. 6D shows an embodiment in which an emitter follower type is employed by using bipolar transistors D13, D23 for the non-linear limiter elements. The embodiment of FIG. 6D is improved in the balance between the positive voltage and the negative voltage, and can be operated with a high speed.

Figure 7:
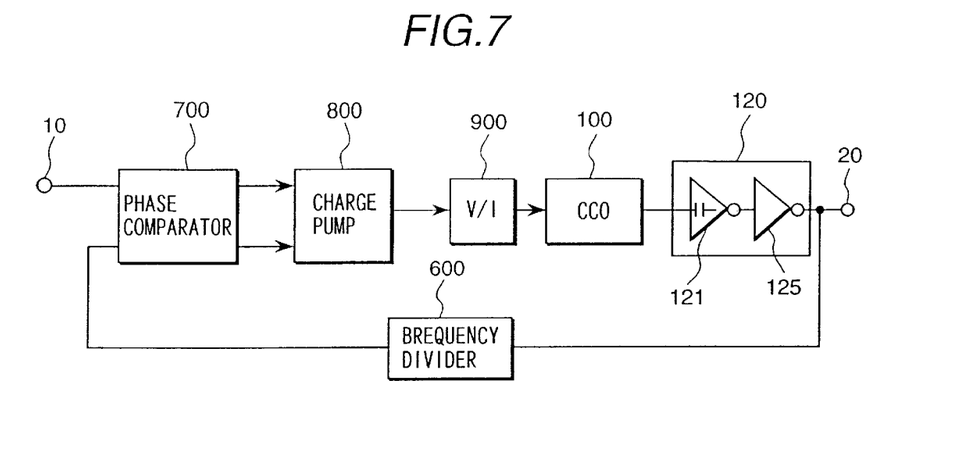
FIG. 7 is a block diagram showing the construction of a phase locking loop (PLL) to which the present invention is applied.

FIG. 7 shows the construction of a phase locking loop (PLL) of a typical high frequency clock generating means to which the present invention is applied.

Referring to FIG. 7, the phase locking loop PLL is formed in a closed loop control circuit composed of a phase comparator 700 for comparing a phase of a reference signal applied through the input terminal 10 with a phase of a feedback signal from a frequency divider 600; a charge pump 800 for converting a phase time difference into a voltage; a voltage-current (V/I) converter 900; a current control oscillator (CCO) 100; a waveform shaping circuit 120 of the present invention; and the frequency divider 600.

The phase locking loop PLL shown in FIG. 7 can make the output frequency of the output terminal 20 equal to the frequency of the oscillator 100. Since the PLL does not need ½ frequency division, it is possible to reduce the consumed power of the oscillator 100, an output buffer amplifier 125 and the frequency divider 600 which consume large electric power. Further, since there is no need to use any ½ frequency divider in the output stage, the duty factor of the waveform in a high frequency is good and accordingly the usable maximum frequency can be increased.

Figure 8:
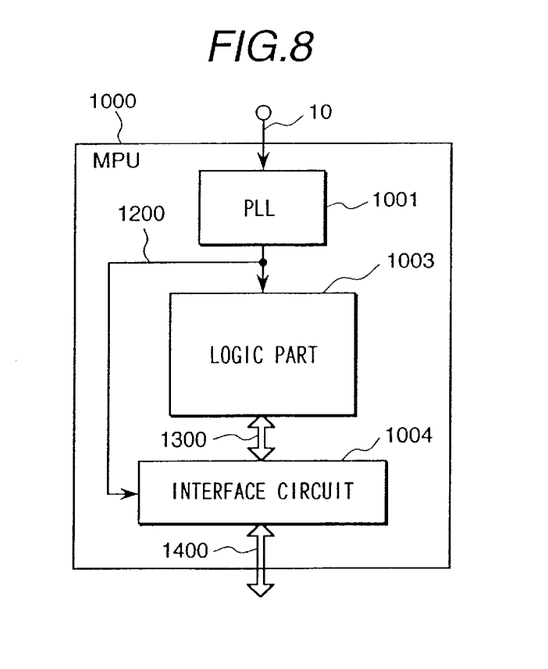
FIG. 8 is a block diagram showing the construction of a microprocessor using the PLL to which the present invention is applied.

FIG. 8 is a block diagram showing the construction of a microprocessor using the phase locking loop PLL of FIG. 7 in which the waveform shaping circuit of the present invention is applied.

Referring to FIG. 8, the microprocessor MPU 1000 is composed of the PLL 1001, a logical part 1003 and an interface circuit 1004 for input/output signals. The microprocessor 1000 incorporating the PLL having the waveform shaping circuit of 50% duty factor of the present invention can reduce the maximum frequency compared to a microprocessor of a general double frequency clock generating type, and can operate a low voltage circuit. Therefore, it is possible to provide a microprocessor suitable for potable information instrument and potable communication instrument which require low voltage and wide band operation.

Figure 9:
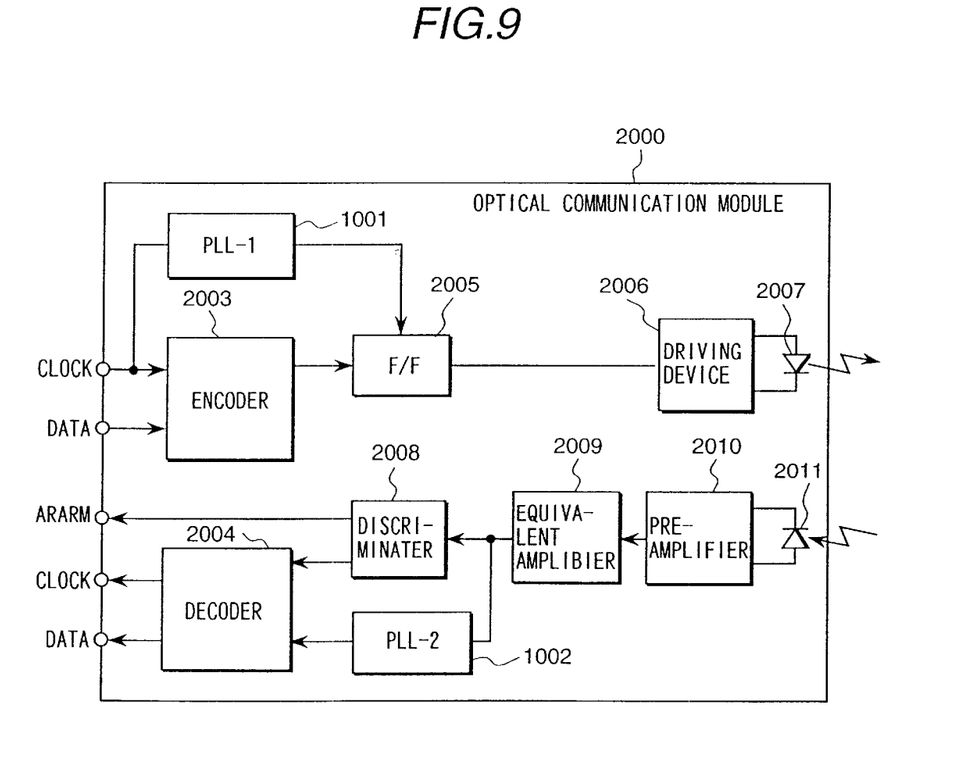
FIG. 9 is a block diagram showing the construction of an optical communication module using the PLL to which the present invention is applied.

FIG. 9 shows the construction of an optical communication (optical fiber communication) module using the phase locking loops PLL of FIG. 7 to which the waveform shaping circuit of the present invention is applied.

Referring to FIG. 9, the PLLs are used for a PLL 1001 (PLL-1) which controls an output synchronous circuit FF 2005 of an encoder 2003 in the transmitter side and a PLL 1002 (PLL-2) for a receiving timing generator which controls a timing of a decoder 2004 by extracting a clock frequency component from a received signal in the receiving side. When the PLL using the waveform shaping circuit of the present invention is used for such an optical communication module 2000, the consumed power and the physical size of the optical communication module can be reduced, and the clock noise is reduced and accordingly the S/N ratio in the receiving side can be improved.

Figure 10:
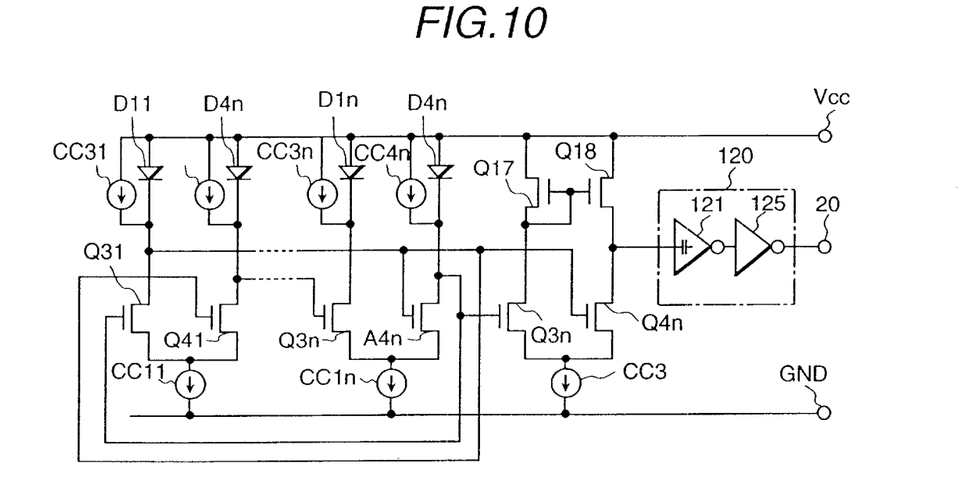
FIG. 10 is a circuit diagram showing another embodiment of an oscillator in accordance with the present invention.
Figure 11:
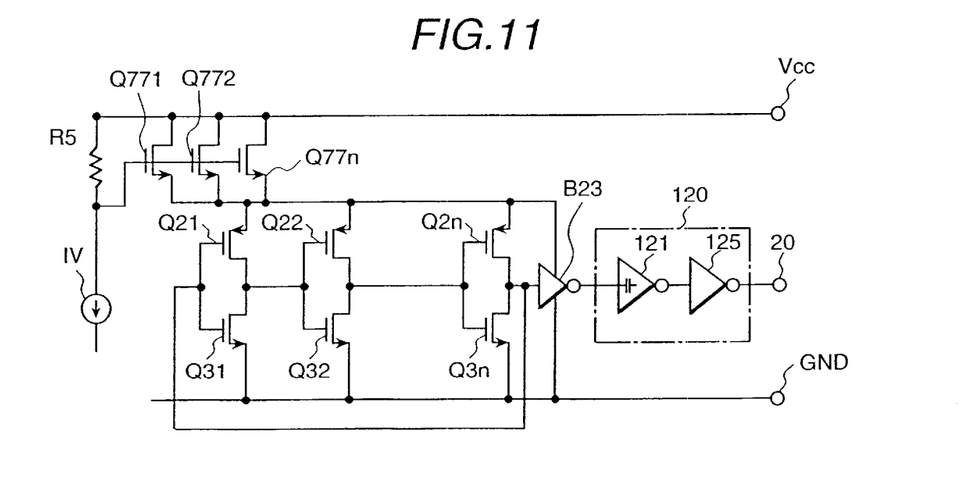
FIG. 11 is a circuit diagram showing an example of a clock oscillator used in the present invention.
Figure 12:
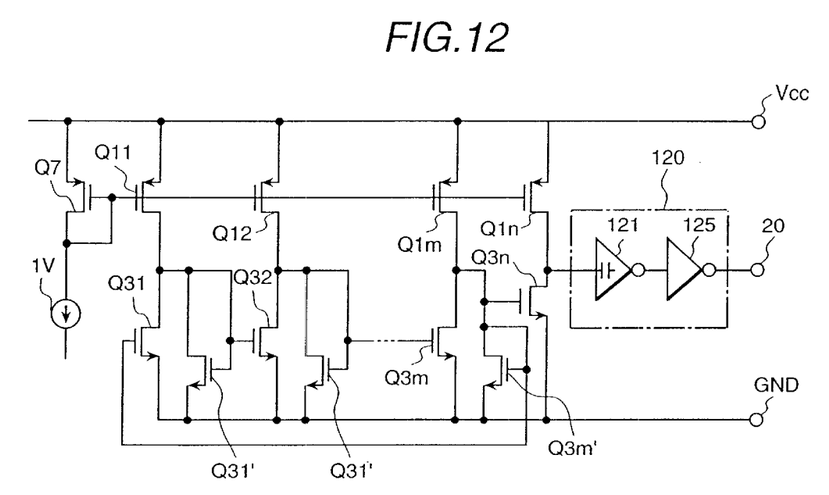
FIG. 12 is a circuit diagram showing another example of a clock oscillator used in the present invention.

FIG. 10 to FIG. 12 show embodiments of coupling with various kinds of ring counters as examples of signal sources preferable to the waveform shaping circuit of the present invention.

FIG. 10 shows a ring counter composed of differential amplifier stages Q31–Q41 to Q3n–Q4n having constant-current circuits CC31 to CC4n and diode clamps D11 to D4n in the load side. The ring counter shown in FIG. 10 is suitable for high frequency and high anti-noise of a power supply.

FIG. 11 shows an oscillator in which power supply voltage of a ring counter composed of pairs of transistors Q21–Q31 to Q2n–Q3n are controlled through source followers Q771 to Q77n. Although the variable oscillator of FIG. 11 has an advantage of capability of high frequency oscillation, a normal circuit is difficult to be connected because the threshold value of the oscillation waveform is not Vcc/2 but varied. However, the waveform shaping circuit 120 of the present invention can be easily connected because its input becomes alternating current coupling. Therein, the reference character R5 is a resistor, and the reference character IV is a constant current circuit.

FIG. 12 shows a construction suitable for low voltage operation. An inverter of the ring oscillator in FIG. 12 is composed of only two MOS transistors in series connection to the power supply voltage. Therefore, since the operating current density of the transistor can be designed relatively high even if the power supply voltage is low, the oscillator is suitable for low voltage and wide band operation and can perform 1 V and 1 GHz operation by combining the low voltage and high frequency characteristic of the waveform shaping circuit 120 of 50% duty factor.

Figure 13:
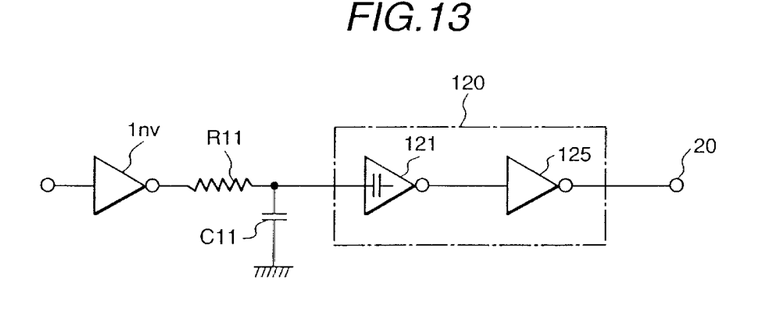
FIG. 13 is a circuit diagram showing connection of a clock oscillator with a waveform shaping circuit to which the present invention is applied.

FIG. 13 shows another embodiment of the present invention in which the waveform is shaped into an arbitrary waveform using a resistor R11 and a capacitor C11 before inputting to the waveform shaping circuit 120 when rising and falling gradients of the waveform of the oscillator 100 are steep. By doing so, operation of the waveform shaping circuit 120 to 50% duty factor can be performed effectively by limiting the rising and falling gradients of the waveform even if the frequency is high.

As having been described above, according to the present invention, the duty factor of clock pulses can be set to 50% with high accuracy even if the clock pulses are of a low voltage and a high frequency.

What is claimed is:

1. A device comprising:
   a ring counter for outputting clock pulses, said ring counter having a plurality of constant-current circuits for varying a frequency of said clock pulses in accordance with a control current; and
   at least one waveform shaping circuit, coupled to receive said clock pulses from said ring counter, comprising:
   an inverter for receiving said clock pulses of said ring counter through an alternating current coupling capacitor;
   diodes in anti-parallel connection for limiting an amplitude of an output of said inverter symmetrically on positive and negative sides thereof, said diodes being disposed between an input and an output of said inverter as feedback elements; and a first constant-current circuit and a second constant-current circuit, wherein an impedance value of said first and second constant current circuits is adjusted in accordance with the control current, said first constant-current circuit and said second constant-current circuit being connected between a power supply side terminal of said inverter and a power supply bus and between a grounding side terminal of said inverter and a grounding bus, respectively, wherein the control current is applied to the constant-current circuits composing said ring counter and the first and said second constant-current circuits so that the clock pulse frequency outputted by the ring counter and the impedance value of the first and second constant current circuits are adjusted in an interlocking manner relative to each other.

2. A device according to claim 1, wherein said at least one waveform shaping circuit comprises a plurality of waveform shaping circuits connected in cascade.

3. A device according to claim 2, wherein said inverter is a CMOS inverter.

4. A device according to claim 2, wherein said inverter is an amplifier.

5. A device according to claim 1, wherein said inverter is a CMOS inverter.

6. A device according to claim 1, wherein said inverter is an amplifier.

* * * * *